(12) United States Patent
Leuthold et al.

(10) Patent No.: US 6,280,088 B1
(45) Date of Patent: Aug. 28, 2001

(54) CROWNED CONICAL BEARING

(75) Inventors: Hans Leuthold, Santa Cruz; Matt L. Shumway, Scotts Valley; Alan L. Grantz, Aptos; Roger A. Addy, Gilroy; Norbert S. Parsoneault, Scotts Valley; Samnathan Murthy, Santa Cruz; Mohamed M. Rahman, San Jose, all of CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/495,615

(22) Filed: Feb. 1, 2000

Related U.S. Application Data

(62) Division of application No. 09/060,312, filed on Apr. 14, 1998, now Pat. No. 6,019,516.

(51) Int. Cl.$^7$ ................................................ F16C 17/10
(52) U.S. Cl. ................................................................ 384/110
(58) Field of Search .................................. 384/110, 108, 384/107, 114, 121

(56) References Cited

U.S. PATENT DOCUMENTS

| 3,174,809 | 3/1965 | Mackie. |
| 5,697,708 | 12/1997 | Leuthold et al. .................... 384/110 |

*Primary Examiner*—Lenard A. Footland
(74) *Attorney, Agent, or Firm*—Thomason, Moser and Patterson (57) ABSTRACT

A bearing assembly including a bearing cone (50) having a crowned bearing surface (56) with V-shaped grooves (60) that are shallow at their apex (62) and deepest at the outer edges (52, 54). When mated with a female bearing seat, lubricating fluid builds up along the midline of the bearing surface as the bearing seat rotates about the bearing cone.

20 Claims, 10 Drawing Sheets

| input | typ | range |
|---|---|---|
| male cone half opening (deg) | 30.04 | 0.4 |
| female cone half opening (deg) | 30.04 | 0.4 |
| crown radius (mm) | 2.00 | 1 |
| male cone minor radius (mm) | 3.023 | 0.01 |
| male cone height (mm) | 2.77 | 0.01 |
| male cone TIR (mm) | 0 | 0.02 |
| male cone cogging angle (deg) | 0 | 0.281759 |

CROWNED CONICAL BEARING

This is a Division of Ser. No. 09/060,312, Apr. 14, 1998, U.S. Pat. No. 6,019,516.

FIELD OF THE INVENTION

The present invention relates to magnetic disc drive storage systems and, more particularly, to a fluid dynamic bearing for rotatably supporting a spindle hub assembly that rotatably supports magnetic disc drives.

BACKGROUND OF THE INVENTION

U.S. Pat. No. 5,559,651 of Grantz et at, entitled "Magnetic Disc Storage System with Hydrodynamic Bearing," discloses a bearing cartridge for rotatably supporting a magnetic storage disc that utilizes fluid-dynamic bearings defined by spherical bearing cones and bearing seats. Spherical bearings are known to improve assembly and alignment tolerances in that they allow for greater angular misalignment of the bearing cone piece with respect to the bearing seat.

Conical bearing designs are also known wherein both the bearing seat and the bearing cone are conical in shape. Conical bearings improve the tilting stiffness of fluid-dynamic bearings and thereby resist radial and axial displacement greater than, for example, spherical bearings. However, conical bearings are more susceptible to angular misalignment, which can significantly affect the performance of the bearing.

The present invention is an attempt to maximize the advantages of spherical and conical bearings while at the same time minimizing their respective disadvantages.

SUMMARY OF THE INVENTION

Briefly described, the present invention comprises a bearing assembly for rotatably supporting a rotating component about a fixed shaft, wherein the bearing assembly includes a bearing cone having a crowned bearing surface, secured to one of the rotating component and the fixed shaft, a conical bearing seat secured to the other of the rotating component and the shaft, and lubricating fluid in a gap between the crowned bearing surface of the bearing cone and the bearing seat. The bearing cone includes grooves for channeling lubricating fluid toward the midline of the crowned bearing surface for creating a fluid bearing between the bearing cone and the bearing seat as the bearing seat rotates about the bearing cone.

According to an aspect of the invention, the grooves in the bearing cone are shallow at the midline of the bearing surface and deep at the outer edges of the bearing surface. In this manner, lubricating fluid is forced out the grooves at the midline and thereby forms a lubricating barrier between the bearing cone and the bearing surface. Preferably, the grooves are V-shaped and their depth is proportional to the crown of the bearing cone.

These and other features, objects, and advantages of the present invention will become apparent from the following description of the best mode for carrying out the invention, when read in conjunction with the accompanying drawings, and the claims, which are all incorporated herein as part of the disclosure of the invention.

BRIEF DESCRIPTION OF THE DRAWINGS

Throughout the several views, like reference numerals refer to like parts, wherein.

DETAILED DESCRIPTION OF A PREFERRED EMBODIMENT

Reference will now be made in detail to the preferred embodiments of the invention, examples of which are illustrated in the accompanying drawings. While the invention will be described in conjunction with the preferred embodiments, it will be understood that the described embodiments are not intended to limit the invention specifically to those embodiments. On the contrary, the invention is intended to cover alternatives, modifications and equivalents, which may be included within the spirit and scope of the invention as defined by the appended claims.

Figure 1:
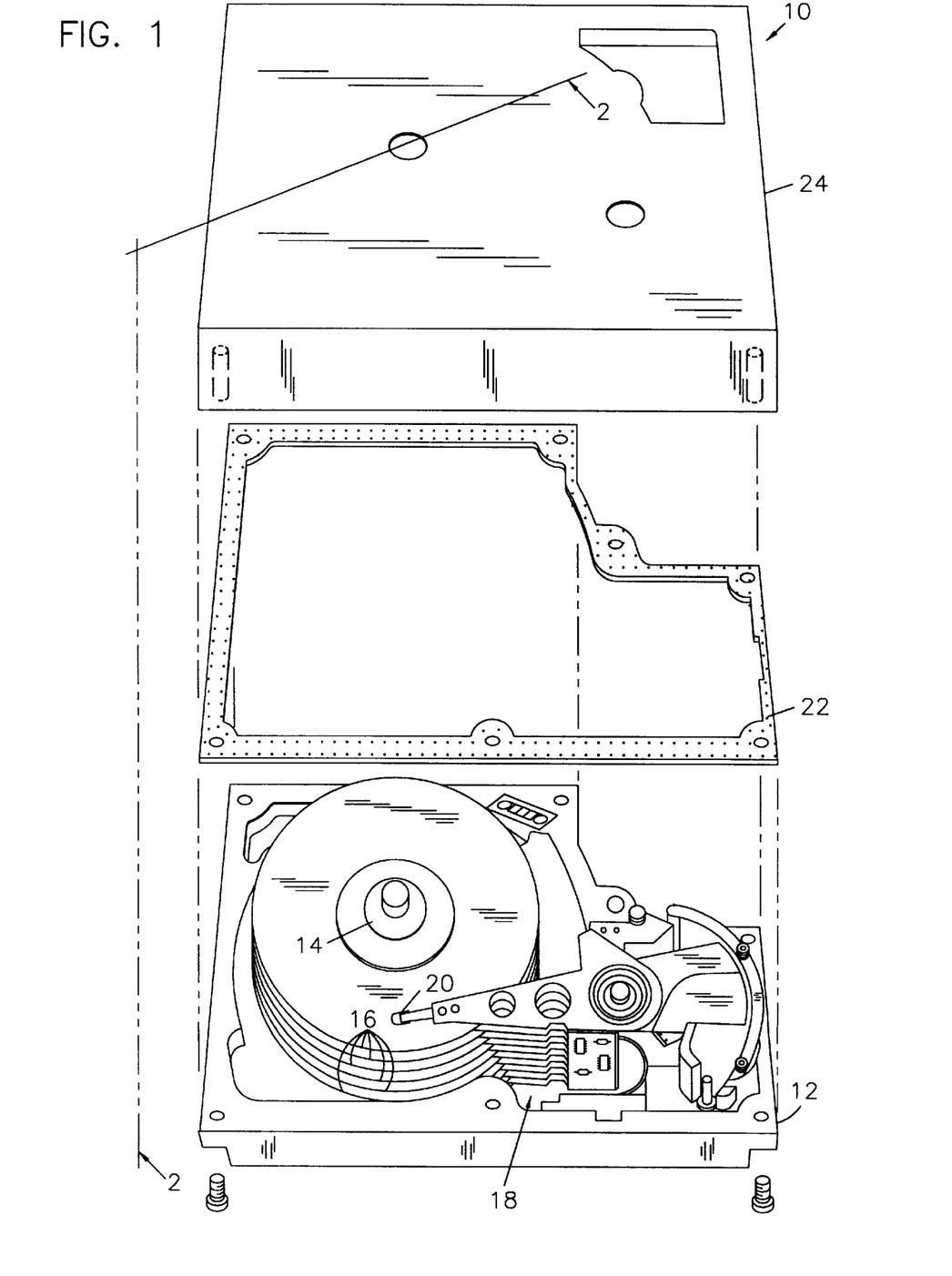
FIG. 1 is an exploded pictorial view of a magnetic disc drive storage system including a fluid dynamic bearing in accordance with the invention.

FIG. 1 is an exploded perspective view of a magnetic disc drive storage system in which the present fluid dynamic bearing could be used. In the example to be discussed below, the use of the fluid dynamic bearing will be shown in conjunction with a spindle motor. However, this bearing cartridge is not limited to use with this particular design of a disc drive, which is shown only for purposes of the example, but has numerous other uses outside the field of disc drives.

In this particular example, the storage system 10 includes a housing base 12 having spindle motor 14 which rotatably carries storage discs 16. An armature assembly 18 moves transducers 20 across the surface of the discs 16. The environment of discs 16 is sealed by seal 22 and cover 24. In operation, discs 16 rotate at high speed while transducers 20 are positioned at any one of a radially differentiated track on the surface of the discs 16. This allows the transducers 20 to read and write magnetically encoded information on the surfaces of discs 16 at selected locations. The discs rotate at very high speeds, several thousand RPM, in order to maintain each transducer flying over the surface of the associated disc. In present day technology, the spacing distance between the transducer and the rotating disc surface is measured in micro inches; thus it is absolutely essential that the disc does not tilt or wobble.

Figure 2:
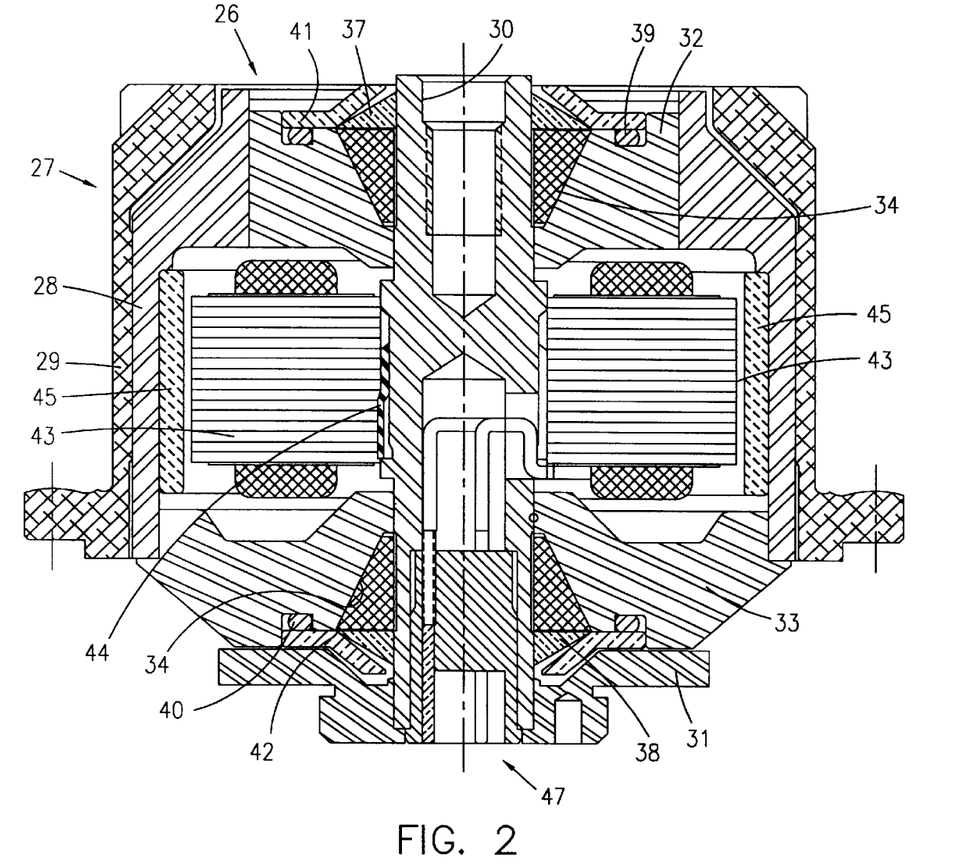
FIG. 2 is a sectional view of the bearing cartridge of the present invention.
Figure 3:
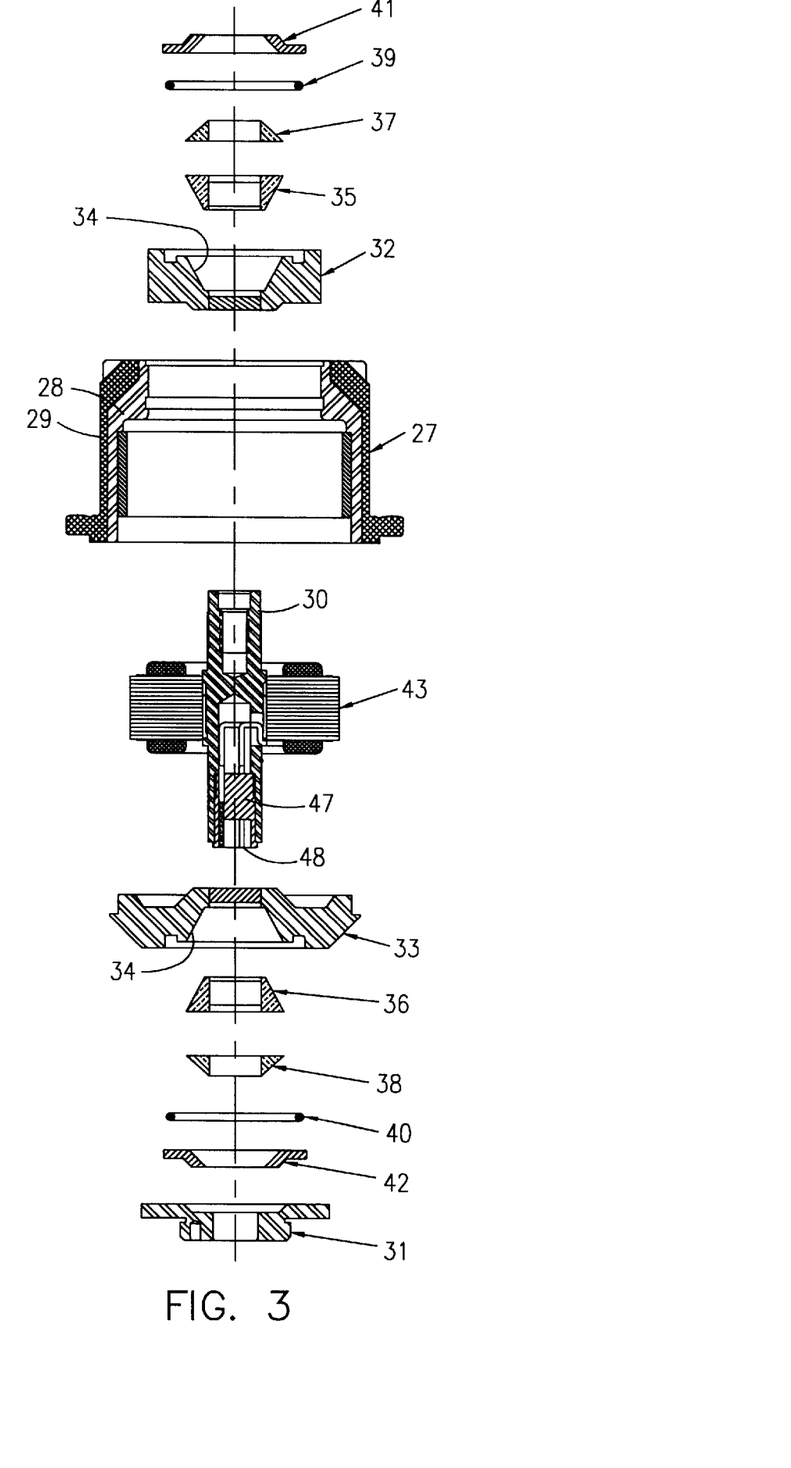
FIG. 3 is an exploded view of the bearing cartridge of the present invention.

FIGS. 2 and 3 show the design of a bearing cartridge 26 that is part of the spindle motor identified in FIG. 1. Bearing cartridge 26 supports a spindle hub assembly 27, which is comprised of a back iron 28 and a cover 29. Bearing cartridge 26 includes a central spindle shaft 30 that is press fit within a bottom mounting flange 31 and which is threadably secured to base 12. Bearing cartridge also includes an upper bearing seat 32 and a lower bearing seat 33, which both include conical bearing surfaces 34. Bearing surfaces 34 engage a pair of bearing cones 35, 36, which are identical and are discussed in more detail later.

Bearing cartridge 26 also includes upper and lower seal cones 37, 38, seal O-rings 39, 40, and shield seals 41, 42. Seal cones 37, 38 are press fit onto spindle shaft 30 and shield seals 41, 42 are press fit onto bearing seats 32, 33.

The spindle motor includes stator windings 43, which are secured about spindle shaft 30 by means of a clip 44, and magnets 45, which are secured to back iron 28.

An electrical connector assembly 47 is mounted within the lower end of spindle shaft 30 and includes electrical leads that are connected to the electrical windings of motor 43. Connector assembly 47 also includes connector pins 48, which provide for reception of a connector from an electrical power source. Connector assembly 47 is discussed in more detail in concurrently filed patent application entitled "Low-Profile In-Shaft Connector," inventors Alan L. Grantz and Marten F. Byl, Ser. No. 09/059,888, filed Apr. 14, 1998, now U.S. Pat. No. 5,997,357.

Figure 4:
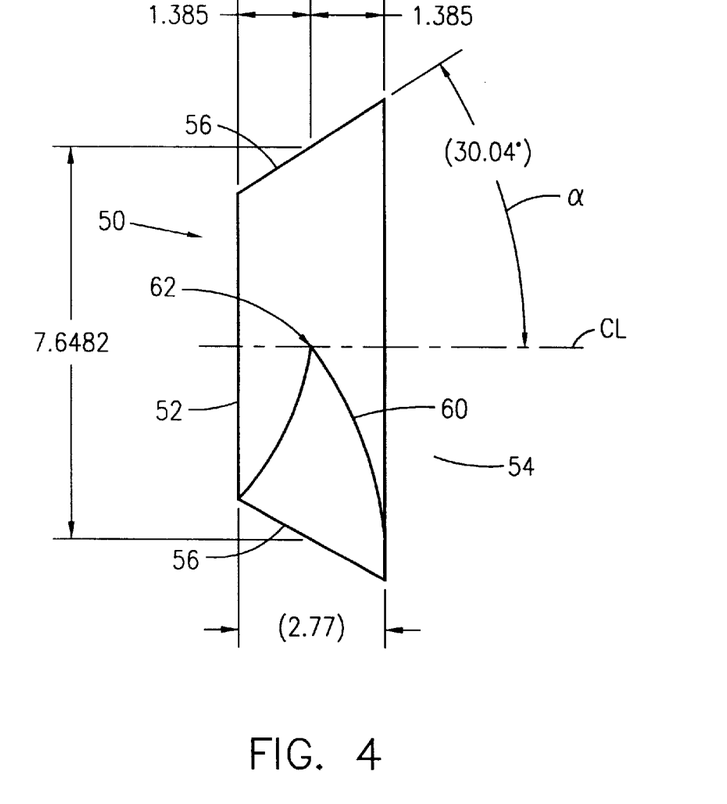
FIG. 4 is a schematic side view of the bearing cone of the bearing cartridge.
Figure 5:
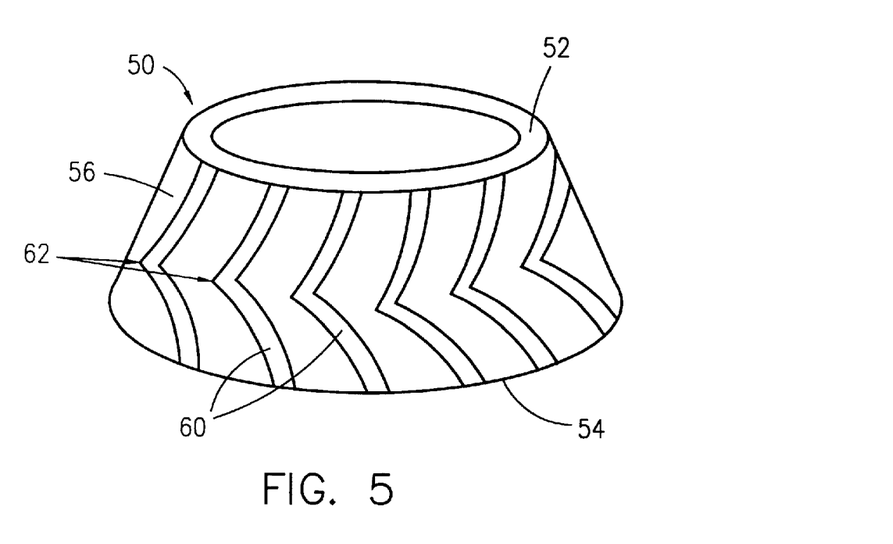
FIG. 5 is a pictorial view of the bearing cone of the bearing cartridge.

Referring to FIGS. 4 and 5, the bearing cone 50 shown in these figures is representative of both the top bearing cone 35 and the bottom cone 36. Bearing cone 50 includes a small diameter inner side 52 and a wide diameter outer side 54. The crowned bearing surface 56 of cone 50 is discussed in more detail later.

The angle a between center line CL the line formed by bearing surface 56 is 30.04° at manufacture. During assembly, cone 50 is press fit onto the spindle shaft and due to the varying thickness of the cone, the cone flexes and the resulting angle of bearing surface 56 is approximately 30.00°.

Bearing surface 56 includes a series of generally V-shaped grooves 60 uniformly spaced around the periphery of the bearing surface. The apexes 62 of the grooves are aligned along a lateral midline of the cone 50, midway of the height of the cone. Grooves 62 function to channel lubricating fluid across the angled surface of the cone in a pumping action discussed later.

FIG. 4 provides some exemplary dimensions of a commercial version of the bearing cone. For example, bearing cone 50 is 2.77 mm in height and 7.65 mm in width at its midline.

Figure 6:
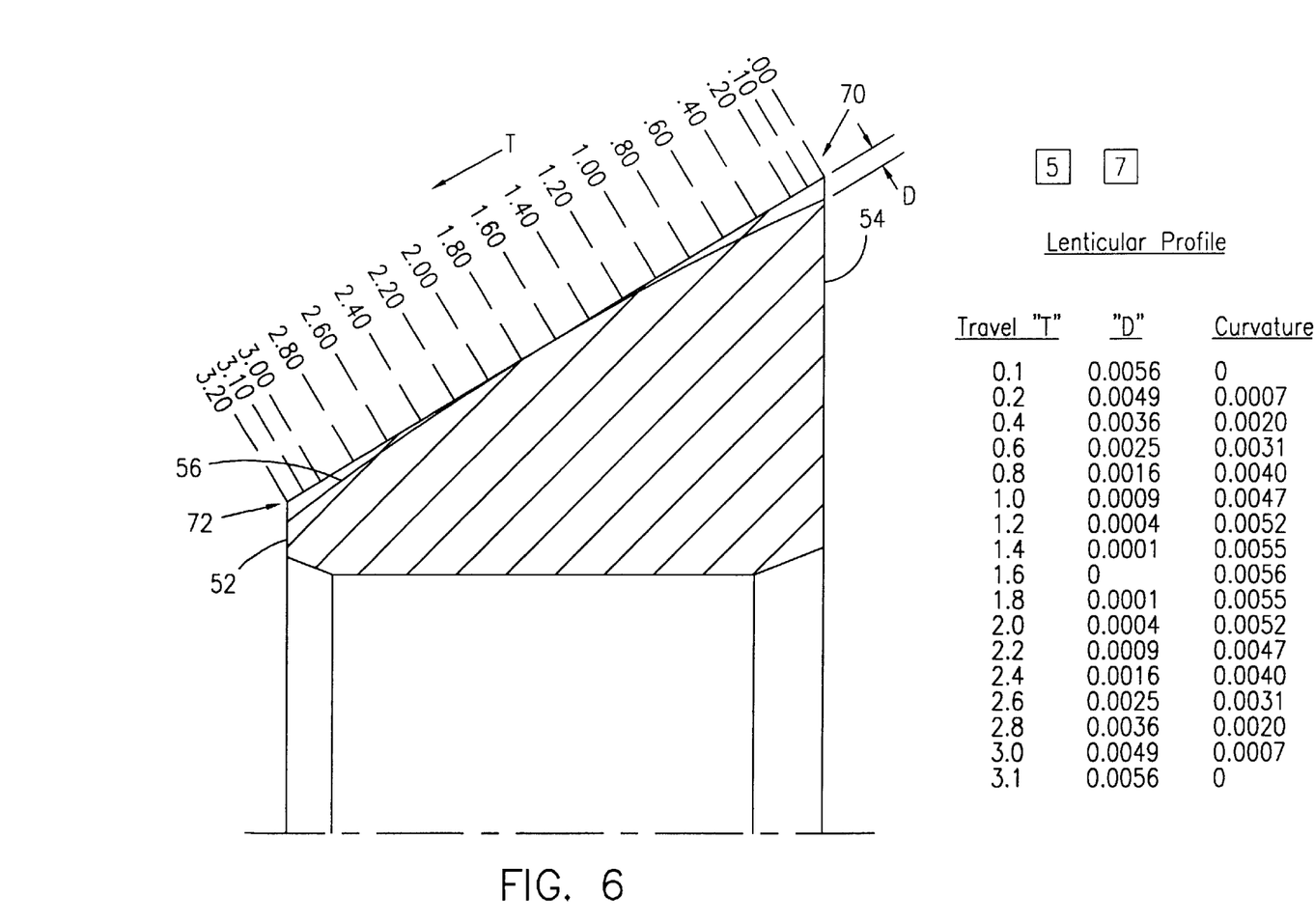
FIG. 6 is a sectional view of one half of the upper bearing of the bearing cartridge with a chart showing curvature of bearing surface of the cone.

FIG. 6 shows the lenticular profile that gives cone 50 its crowned bearing surface 56. In FIG. 6, travel T indicates the distance along the bearing surface between designated points and the upper corner edge 70 of the cone. Starting with a 0.1 mm point and in increments of 0.2 mm, for each indicated point the delta gap D represents the distance between the crowned bearing surface and the surface of a perfectly conical bearing. At the point 1.6 mm from corner point 70, D is zero. This point corresponds to the midline of the bearing cone. The delta gap D symmetrically grows in opposite directions toward the corners of the bearing surface. At the corners 70, 72, the delta gap is 0.0056 mm. These numbers correspond to a radius of curvature of 200 mm, which is discussed in more detail later.

Figure 7:
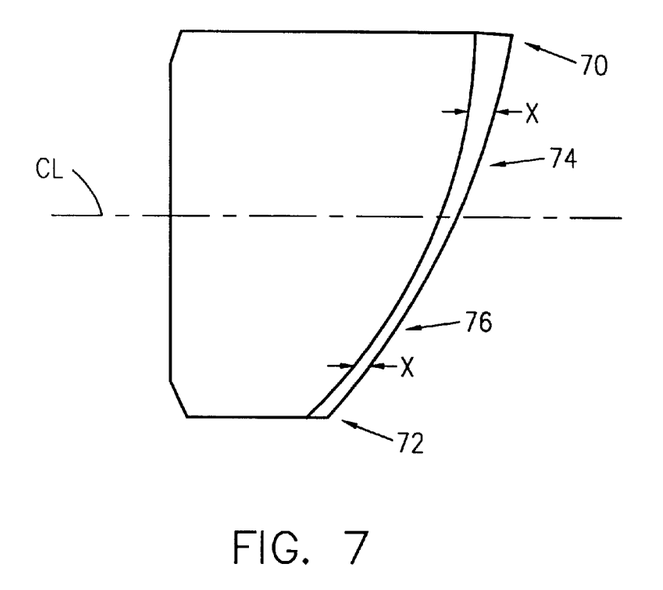
FIG. 7 is a sectional view of the bearing cone showing the groove depth.

Referring to FIG. 7, the depth X of a groove 60 is proportional to the delta gap shown in FIG. 6. At the midline CL of the cone 50, groove 60 is at its shallowest and its depth X is approximately 0.0055 mm. At the upper corner 70 and lower corner 72, groove 60 has its greatest depth, which is approximately 0.01167 mm. At points 74, 76, midway between centerline CL and corners 70, 72, groove 60 has a depth of approximately 0.00704 mm. These numbers are meant to be exemplary only and it is not intended that the present invention be limited to grooves of any particular depth. However, as discussed later, performance of the cone improves with groove that are shallow at the midline and deeper toward the corner edges.

Figure 8:
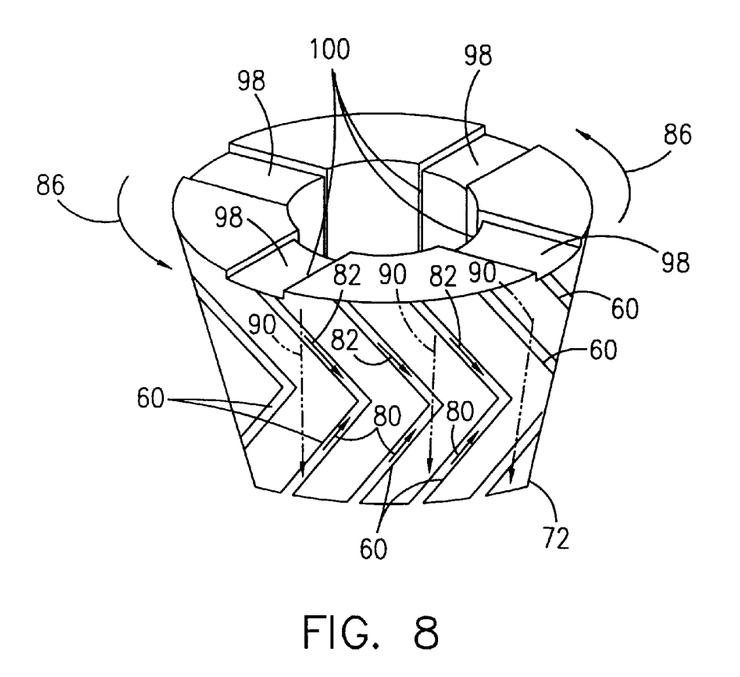
FIG. 8 is a pictorial view of the bearing cone, with arrows indicating the direction of oil flow across the crowned surface of the cone.

Referring to FIG. 8, grooves 60 are designed to channel lubricating oil through the channels of the grooves toward the apex 60 of the grooves, as shown by arrows 80, 82. As the bearing seat (not shown) rotates in the direction of arrows 86, and the cone remains fixed in position, the sweeping action of the bearing seat surface forces the lubricating oil to move through the channels toward the apex 62.

At the apex 60, lubricating fluid builds up due to the convergence of the channels and escapes the channel to form a lubricating barrier that functions as the fluid dynamic bearing of the bearing cartridge. Because the surface area of the upper half of the grooves, where lubricating oil indicated by arrows 82 flows, is greater than the surface area of the lower half of the grooves, where lubricating oil indicated by arrows 80 flows, the net result is a general flow of lubricating oil from the outer edge 70 to the inner edge 72, as indicated by broken arrows 90. The inward force created by grooves 60 needs to be sufficient to overcome the centrifugal force that without the grooves, would cause the lubricating oil to flow in a reverse direction from inner edge 72 to outer edge 70. The terms "inward" and "inner" as used herein refer to a direction or location toward the center of the bearing cartridge, whereas the terms "outward" and "outer" as used herein refer to a direction or location toward the upper and lower sides of the bearing cartridge.

Figure 9:
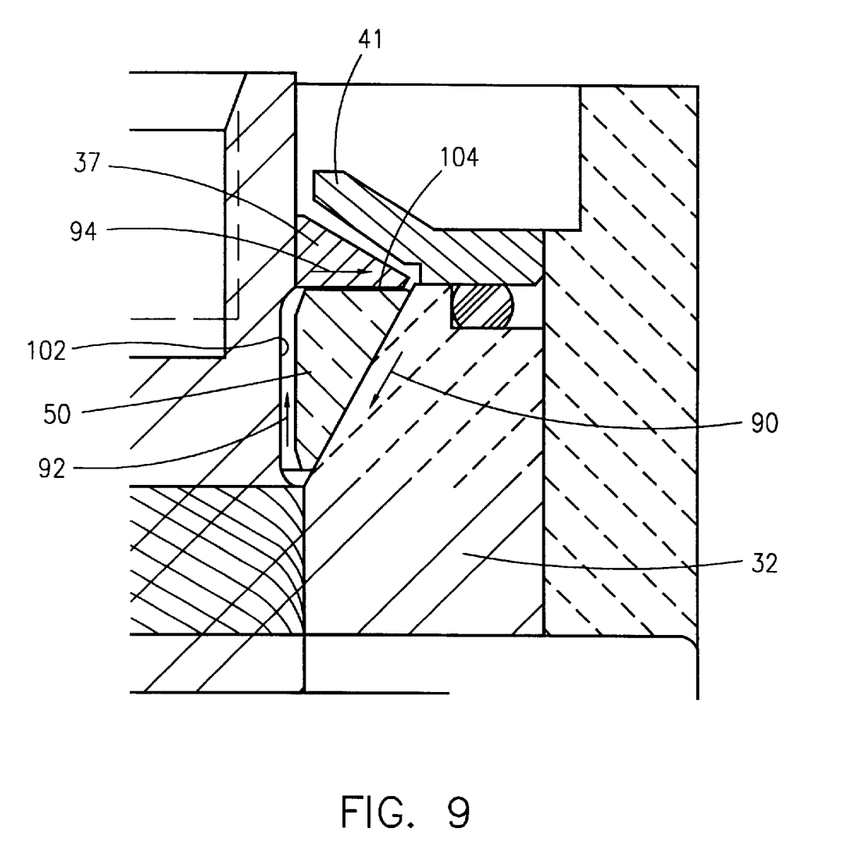
FIG. 9 is a sectional view of the upper right quadrant of the bearing cartridge showing one half of the upper bearing cone.

Referring to FIG. 9, arrow 90 indicates the direction of oil flow down between the crowned surface of the bearing cone 50 and the conical surface of the bearing seat 32. The oil flows in a clockwise direction as shown, with the oil return back up the inner side of the bearing cone, as indicated by arrow 92, and then moving radially outwardly between the upper surface of the bearing cone and the lower surface of the seal cone 37 through channels in seal cone 37 or bearing cone 50, as indicated by arrow 94.

FIG. 8 shows a preferred embodiment where bearing cone 50 includes four top surface channels 98 and four corresponding inner surface channels 100 (only three of which are shown in FIG. 8). With this bearing cone design, the spindle shaft is smooth and the underside of the seal cone 37 does not include channels. An alternative design, shown in FIG. 9, places the inner return channels 102 in the spindle shaft and the upper return channels 104 in the lower surface of the seal cone. With this alternative embodiment, the channels 98, 100 of bearing cone 50 are eliminated.

The operation of the fluid dynamic bearing shown in FIG. 9 is discussed in more detail in concurrently filed patent application entitled, "Asymmetric Sealing Means for Fluid Dynamic Bearing," inventor Alan L. Grantz, Ser. No. 09/060,224, filed Apr. 14, 1998, now U.S. Pat. No. 5,908, 113, which is incorporated herein. The design of seal cones 37, 38 and shield seals 41, 42 are discussed in more detail in concurrently file patent application entitled, "Centrifugal Capillary Seal," inventors Alan L. Grantz and Mohamed M. Rahman, Ser. No. 09/060,328, filed Apr. 14, 1998, now U.S. Pat. No. 5,908,113, The crowning radius of 200 mm has been determined to be optimal for a commercial bearing cartridge of the type disclosed for a magnetic disc drive system. In general, the crowning radius allows for greater manufacturing tolerances and assembly misalignment. For example, if the bearing cone were perfectly conical, i.e. had no crowning radius, the slightest angular misalignment of the bearing cone onto the spindle shaft would cause the contact points between the bearing cone and the bearing seat to be at the upper and lower corner edges of the bearing cone. This would cause unacceptably high wear on the bearing cone and seat and would result in poor performance of the fluid dynamic bearing. By crowning the bearing surface of the bearing cone, while keeping the bearing surface of the bearing seat conical, a small range of misalignment is permitted without adversely affecting bearing performance.

However, if the crowning radius is too large, than the contact points could still fall beyond the upper and lower corner edges, resulting in the same unacceptable level of wear and poor performance. The crowning radius should be selected for a particular bearing cartridge design so that the contact points fill between the upper and lower corner edges of the bearing cone surface. The following example should provide sufficient guidance to one skilled in the art to properly select a crowning radius for a given application.

Figure 10:
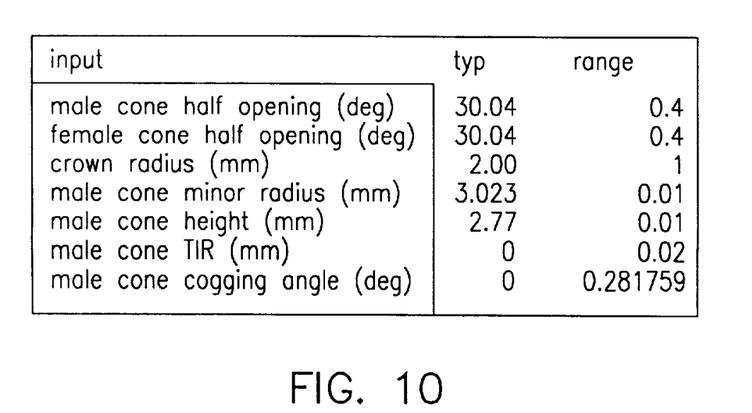
FIG. 10 is a chart of the nominal dimensions and their tolerances for the components that affect the relative positions of the bearing cone and the bearing seat.

Referring to FIG. 10, a list of typical dimensions and a range of expected tolerances are provided for the various factors affecting alignment of the bearing cone within the bearing seat. The "male cone half opening" is the angle between the grooved surface of the bearing cone (the "male cone") and the central axis of the bearing cone. Optimally, this angle is 30.00° when the bearing cone is press fit onto the spindle shaft. However, since the bearing cone distorts or flexes, when mounted to the shaft, due to the varying thickness of the cone along its height, the cone is manufactured with an angle of 30.04°, in order to compensate for the flexing of the cone.

The "female cone half opening" is the angle formed by the bearing seat (the "female cone"), which should correspond to the angle of the male cone. Crowning radii between 50 mm and 250 mm were selected and the contact point for each crowning radius was calculated. The "male cone minor radius" is an arbitrary figure used only to set a geometric reference point for the bearing cone, and specifically corresponds to the radius of the inner corner edge 72, as measured from the central axis of the bearing cone (FIG. 8). Typically, this radius is 3.023 mm with a range of 0.01 mm. The male cone height is the height of the bearing cone, which typically is 2.77 mm with a range of 0.01 mm. The "male cone TIR" is used to calculate the "male cone cogging angle." The TIR is a measurement of the amount of "wobble" of a bearing cone when press fit onto a rotatable shaft at an angle that is not perfectly perpendicular to the shaft. Typically this amount of wobble is zero with a range of 0.02 mm. This translates into a male cone cogging angle of zero with a range of 0.281759 degrees.

Figure 11:
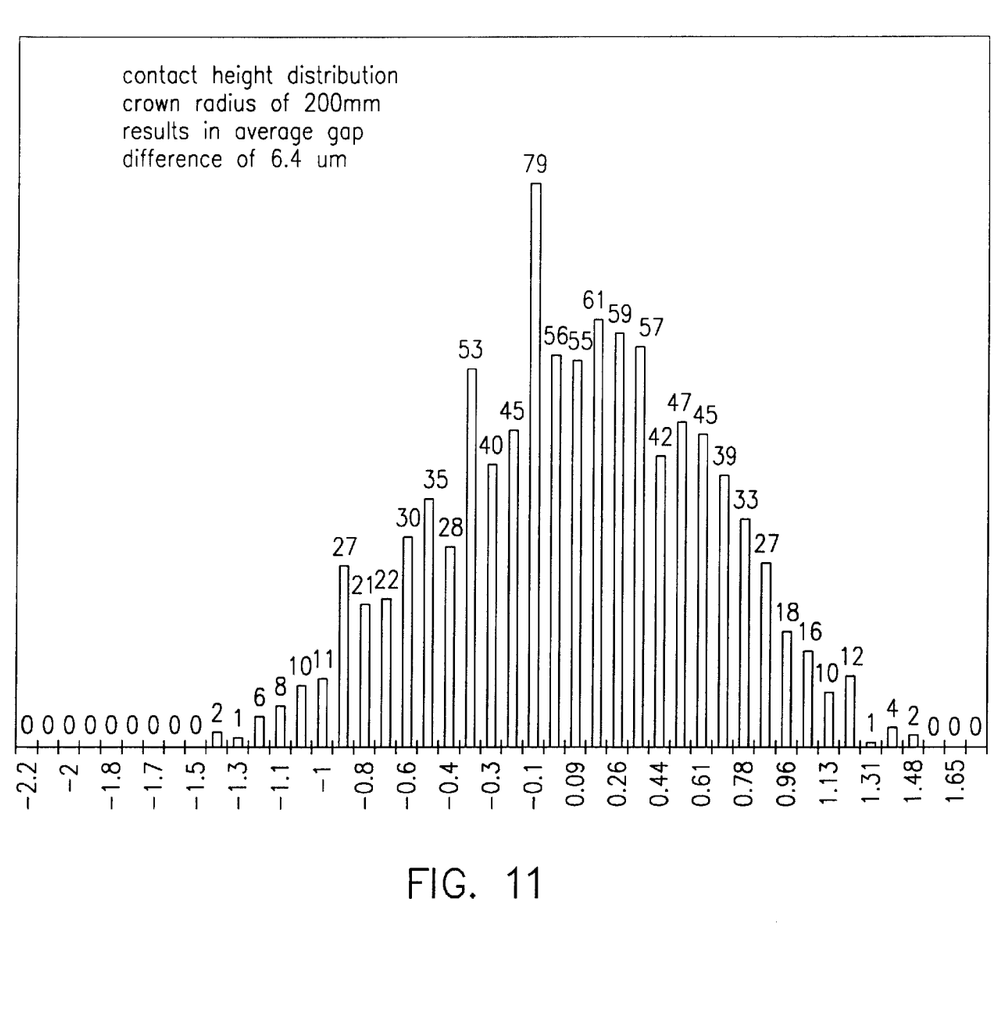
FIG. 11 is a chart showing the distribution of contact heights on the surface of the bearing cone.

Referring to FIG. 11, the contact point height distribution was obtained by using a Monte-Carlo analysis where a figure for each parameter shown in FIG. 10 was randomly selected within its range. The Monte-Carlo analysis was calculated with linearly distributed variables, however, a Gaussian distribution assumption would produce a narrower contact point variation. The contact point was calculated as a matter of the resulting geometry. A contact point of 0.0 corresponds to the midline of the bearing cone, which means that the bearing cone is perfectly aligned on the shaft and the bearing seat is perfectly aligned as well. As the relative angle of the bearing seat to the bearing cone changes, there is a corresponding set of contact points—on one side of the bearing cone the contact point is above the midline and on the other side of the bearing cone, the contact point is below the midline.

FIG. 11 shows the resulting probability distribution of the contact point on the bearing surface. The bearing cone has a height of 2.77 mm. The contact point is measured from the midline of the bearing cone. The contact height distribution shows that with a crowning radius of 200 mm the contact point is contained within the height of the cone, which is approximately +/−1.38mm.

Figure 12:
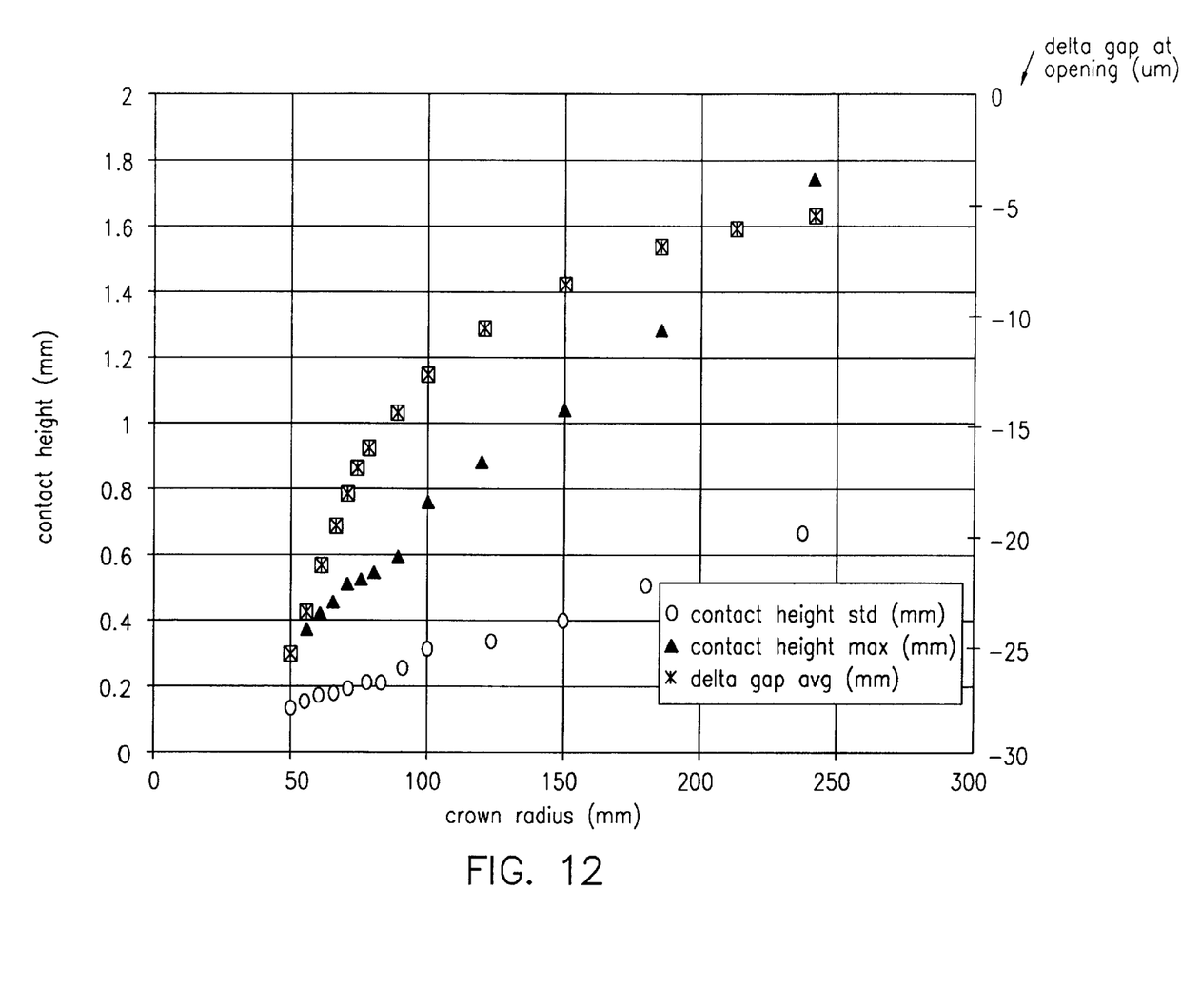
FIG. 12 is a chart showing the contact height standard deviation, contact height maximum, and the delta gap average.

FIG. 12 shows the maximum and standard deviations of contact height as the function of 14 different crowning radii. FIG. 12 also shows the variation in the bearing gap resulting from the crowning. This is expressed as the "delta gap" and is the gap at the upper corner edge of the bearing cone. The contact height maximum deviation is limited by the height of the bearing cone, which in the example given, is one half of 2.77 mm, or approximately 1.38 mm. This corresponds to a crowning radius of 200 mm. At this crowning radius, the delta gap average is approximately 6.4 $\mu$m, which can be read from the right column, starting with zero at the top. With smaller crowning radia, the delta gap grows, where at a crowning radius of 50 mm, the delta gap is approximately 25 $\mu$m. Since it is desirable to maintain as small a delta gap as possible, a maximum crowning radius that results in a contact height within the surface of the bearing cone should be selected, which is a crowning radius of 200 mm.

For other geometries, different crowning radii would minimize the delta gap and thereby optimize performance of the bearing, since a smaller gap increases the stiffness of the fluid dynamic bearing. Therefore, the present invention is meant to include a crowned bearing cone with a crowning radius that results in the contact point falling between the upper and lower corner edges of the bearing surface of the cone.

Figure 13:
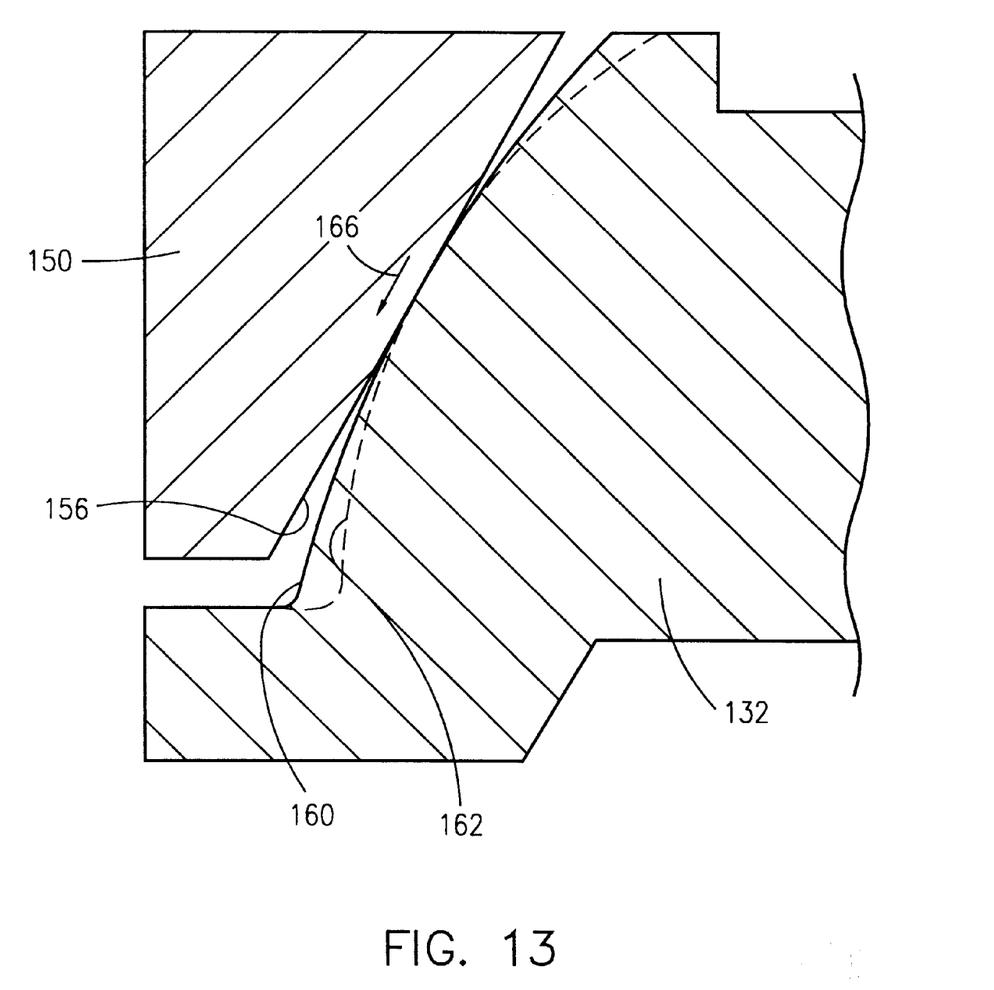
FIG. 13 is a sectional view of an alternative embodiment where the crowned bearing surface and grooves are provided on the bearing seat.

The present invention is not meant to be limited to a bearing arrangement where the bearing cone is crowned and the seat is conical. A reverse arrangement would also work where the bearing seat is crowned and the bearing cone is conical. This is shown in FIG. 13 where bearing cone 150, otherwise identical to the bearing cones previously described, includes a straight conical bearing surface 156 and bearing seat 132 has a crowned surface 160. The crowning of bearing seat surface 160 is governed by the same design considerations previously discussed with respect to the crowning of the bearing cone and achieves the same effect of causing fluid to migrate in the direction of arrow 166. In addition, bearing seat 132 can be provided with grooves 162, in a similar fashion to the provision of grooves in the bearing cones. Grooves 162 are shallow at the midpoint of the bearing swig and deepest at the inner and outer edges of the bearing surfaces. As shown, the crowning of bearing seat surface 160 and the depth of groove 162 are exaggerated for clarity.

Furthermore, the crowned bearing surface can be provided on one of the bearing cone and bearing seat while the grooves are provided on the other of these two bearing components. Thus, many configurations are possible due to the fact that the crowned surface and the grooves can act somewhat independently of each other and, therefore, be provided on different bearing components, or on the same component.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto when read and interpreted according to accepted legal principles such as the doctrine of equivalents and reversal of parts.

What is claimed is:

1. A magnetic disc storage system for rotatably supporting a magnetic storage disc, comprising
    a base,
    a shaft mounted to the base, the shaft including opposed first and second bearing cones each having a crowned bearing surface that at least partially faces the crowned bearing surface of the other bearing cone,
    a hub rotatably mounted on the shaft for carrying the magnetic storage disc, the hub including a first conical bearing seat for rotatably cooperating with the first bearing cone and a second conical bearing seat for rotatably cooperating with the second bearing cone, the first and second bearing seats being positioned, along the length of the shaft, between the first and second bearing cones, so that the bearing seats hold the hub for rotation about the shaft, and
    lubricating fluid in a gap between the crowned bearing surface of the first conical bearing and the first bearing seat and in a gap between the crowned bearing surface of the second conical bearing and the second bearing seat.

2. The magnetic disc storage system of claim 1 wherein, a contact point is defined between the crowned bearing surface of the first bearing cone and the first bearing seat and between the crowned bearing surface of the second bearing cone and the second bearing seat, and wherein the crowning radius of the crowned bearing surface of the first and second bearing cones establishes the contact point for each bearing seat and bearing cone between the outer corner edges of the crowned bearing surface.

3. The magnetic disc storage system of claim 1 wherein, the shaft, the first and second bearing cones, and the hub all are designed to have manufacturing tolerances, and the crowning radius of each bearing cone minimizes the resulting axial location of the contact point between the crowned bearing surface and the bearing seat.

4. The magnetic disc storage system of claim 1 wherein, the crowned bearing surface of each bearing cone has a series of grooves for channeling lubricating fluid towards the midline of the crowned bearing surface.

5. The magnetic disc storage system of claim 1 wherein, the crowned bearing surface of each bearing cone has a series of V-shaped grooves in the bearing surface, each V-shaped groove including an apex positioned approximate the midline of the crowned bearing surface.

6. The magnetic disc storage system of claim 5 wherein, the V-shaped grooves of each crowned bearing surface point in the direction of movement of the bearing seats of the hub, so that lubricating fluid between the crowned bearing surface and the bearing seat moves inwardly within each groove toward its apex to generate fluid buildup at the apex and thereby achieve a lubricating layer of fluid between the bearing cones and the bearing seats.

7. The magnetic disc storage system of claim 5 wherein, the depth of each V-shaped groove varies along its length, with the depth being greatest at the upper and lower edges of the bearing surface and being shallowest at the apex.

8. The magnetic disc storage system of claim 7 wherein, the depth of each V-shaped groove gradually decreases from the upper and lower edges to the apex.

9. The magnetic disc storage system of claim 8 wherein, the depth of the V-shaped grooves is proportional, at any given point, to the gap between the crowned bearing surface and the bearing seat.

10. The magnetic disc storage system of claim 1 wherein, the bearing cones each include a channel for circulating lubricating fluid around the bearing cone.

11. The magnetic disc storage system of claim 10 wherein, the channel extends along the inner side of the bearing cone and along the outer side of the bearing cone.

12. A bearing cartridge for rotatably supporting a rotating component about a fixed shaft, comprising
    a bearing cone having a crowned bearing surface, secured to the rotating component
    a conical bearing seat secured to the rotating component, and
    lubricating fluid in a gap between the conical bearing surface of the bearing cone and the crowned bearing surface of the bearing seat,
    one of the bearing cone or bearing seat including grooves for channeling lubricating fluid toward the midline of the crowned bearing surface for creating a fluid bearing between the bearing cone and the bearing seat.

13. The bearing cartridge of claim 12 wherein, the grooves are V-shaped with their apexes at the midline of the crowned bearing surface.

14. The bearing cartridge of claim 13 wherein, the grooves are shallow at the midline of the crowned bearing surface and are deep at the edges of the crowned bearing surface.

15. The bearing cartridge of claim 14 wherein, the depth of the grooves is proportional to the crown of the bearing surface.

16. A magnetic disc storage system for rotatably supporting a magnetic storage disc, comprising
    a base,
    a shaft mounted to the base, the shaft including opposed first and second bearing cones,
    a hub rotatably mounted on the shaft for carrying the magnetic storage disc, the hub including a first bearing seat for rotatably supporting the first bearing cone and a second bearing seat for rotatably supporting the second bearing cone, the first and second bearing seats being positioned, along the length of the shaft, between the first and second bearing cones, so that the bearing seats support the hub on the shaft, and lubricating fluid in a gap between the first bearing cone and the first bearing seat and in a gap between the second bearing cone and the second bearing seat, the first bearing seat and the second bearing seat having a crowned surface, and the first bearing cone and the second bearing cone having a conical surface.

17. The magnetic disc storage system of claim 16 wherein, one of the first bearing cone and the first bearing seat and one of the second bearing cone and second bearing seat has a series of grooves for channeling lubricating fluid towards a midline of the bearing surface.

18. The magnetic disc storage system of claim 16 wherein, there is a potential contact point between the crowned bearing surfaces and the conical bearing surfaces and wherein the crowning radius of the crowned bearing surfaces results in a contact point that falls between the outer corner edges of the crowned bearing surfaces.

19. The magnetic disc storage system of claim 16 wherein, the shaft, the first and second bearing cones, and the hub all are designed to have manufacturing tolerances, and the crowning radius of each bearing component minimizes a resulting axial location of the contact point between the crowned bearing surface and the conical bearing surface.

20. A bearing cartridge for rotatably supporting a rotating component about a fixed shaft, comprising bearing means for supporting the rotating component for rotation about the shaft, and fluid means for lubricating bearing surfaces of the bearing means.

* * * * *